United States Patent [19]

Melin, Jr.

[11] 3,907,523
[45] Sept. 23, 1975

[54] METHOD FOR REMOVING SO₂ FROM GASES

[75] Inventor: Deering D. Melin, Jr., Palo Alto, Calif.

[73] Assignee: Krebs Engineers, Menlo Park, Calif.

[22] Filed: Aug. 21, 1974

[21] Appl. No.: 499,208

Related U.S. Application Data

[63] Continuation-in-part of Ser. No. 318,204, Dec. 26, 1972, abandoned.

[52] U.S. Cl. ................... 55/73; 55/94; 423/242
[51] Int. Cl.² ............................................. B01D 53/14
[58] Field of Search ............... 55/19, 73, 85, 89, 90, 55/93, 94, 223, 228, 229, 233; 423/242

[56] References Cited
UNITED STATES PATENTS

| | | |
|---|---|---|
| 3,370,402 | 2/1968 | Nakai et al. .......................... 55/94 |
| 3,387,889 | 6/1968 | Ziemba et al. ........................ 55/233 |
| 3,616,597 | 11/1971 | Stewart ................................. 55/19 |
| 3,687,613 | 8/1972 | Rickard ................................. 55/73 |

OTHER PUBLICATIONS

Flue Gas Desulfurization, Western Precipitation Division, Joy Manufacturing Company, June 1972.

*Primary Examiner*—Charles N. Hart
*Attorney, Agent, or Firm*—Flehr, Hohbach, Test, Albritton & Herbert

[57] ABSTRACT

Process for removing contaminants (particularly SO₂ gas) from industrial waste gases such as are produced by the burning of sulfur containing fossil fuels or in smelting operations. The process uses a multistage scrubber with each stage separately supplied with lime slurry controlled as to pH for optimum efficiency.

4 Claims, 1 Drawing Figure

US Patent   Sept. 23,1975   3,907,523

METHOD FOR REMOVING SO₂ FROM GASES

CROSS-REFERENCE TO RELATED APPLICATION

This application is a continuation-in-part of application Ser. No. 318,204, filed Dec. 26, 1972 and now abandoned.

BACKGROUND OF THE INVENTION

Various types of scrubbers and scrubbing mediums have been used for the removal of sulfur dioxide and other contaminants from industrial waste gases. Various types of scrubbers include those using packed beds, fluidized or floating beds, spray towers, venturi passages, and screens wetted by sprays. A scrubber of the latter type is disclosed in U.S. Pat. No. 3.036,417. In many scrubbing operations water is used without the addition of any chemical, particularly where the problem of sulfur dioxide removal is not serious. A scrubber supplied with water as a scrubbing medium is generally effective in the removal of dust particles, and may also remove some gases that are readily soluble in or absorbed by water. For effective removal of sulfur dioxide it has been proposed to use an alkaline scrubbing medium, and particularly a milk of lime slurry. The term milk of lime slurry as used herein has reference to a slurry prepared by mixing any one of several discrete calcium compounds with water, including calcium oxide, and slaked lime or calcium hydroxide. By use of a milk of lime slurry as a scrubbing medium it has been possible to remove a major part of the sulfur dioxide present in waste gases, depending upon such factors as the type of scrubber used and the effectiveness with which the gas is contacted with the scrubbing medium.

It has been found that the use of a milk of lime slurry in scrubbers for sulfur dioxide removal is subject to certain difficulties. Particularly such an operation is subject to scale formation, which seriously impairs the operating efficiency. Scale formation is attributed to the precipitation of hydrated substances such as calcium carbonate, calcium sulfite and calcium sulfate. Such precipitates deposit upon the inner surfaces of the scrubber, on auxiliary equipment, and in pipelines connected with the scrubber. Severe scaling necessitates frequent shutdown of the equipment for scale removal.

In view of the foregoing it will be evident that there is a need for a scrubbing process and apparatus making use of an alkaline scrubbing medium, which will maintain good operating efficiency over long periods of time without being subject to serious scale formation.

SUMMARY OF THE INVENTION

It is an object of the invention to provide an effective and efficient scrubbing process making use of an alkaline scrubbing medium, which will avoid the serious scaling problems experienced in the past.

Another object of the invention is to provide a scrubbing process capable of effectively removing sulfur dioxide from waste gases, which is controlled with respect to the pH of the scrubbing medium in each stage, whereby optimum scrubbing efficiency is maintained and there is relative freedom from scale formation.

Another object of the invention is to provide a novel apparatus for carrying out the foregoing process, the apparatus being characterized by separate means for receiving and supplying an alkaline scrubbing medium to each of the scrubbing stages, together with the means for controlling the pH in each instance.

In general the present invention makes use of a scrubber having a plurality of separate scrubbing stages through which the gas is directed. An alkali scrubbing medium, namely milk of lime slurry, is separately supplied to each scrubbing stage. Slurry is separately removed from each stage at a constant pH, preferably at or about 5.5 to 6.0, and delivered into holding tanks where it is subjected to alkali conditioning to raise the pH level, and then returned by pumping means to the respective scrubbing stage.

Additional objects and features of the invention will appear from the following description in which the preferred embodiment has been set forth in detail in conjunction with the accompanying drawing.

DETAILED DESCRIPTION OF THE PREFERRED EMBODIMENT

Figure 1:
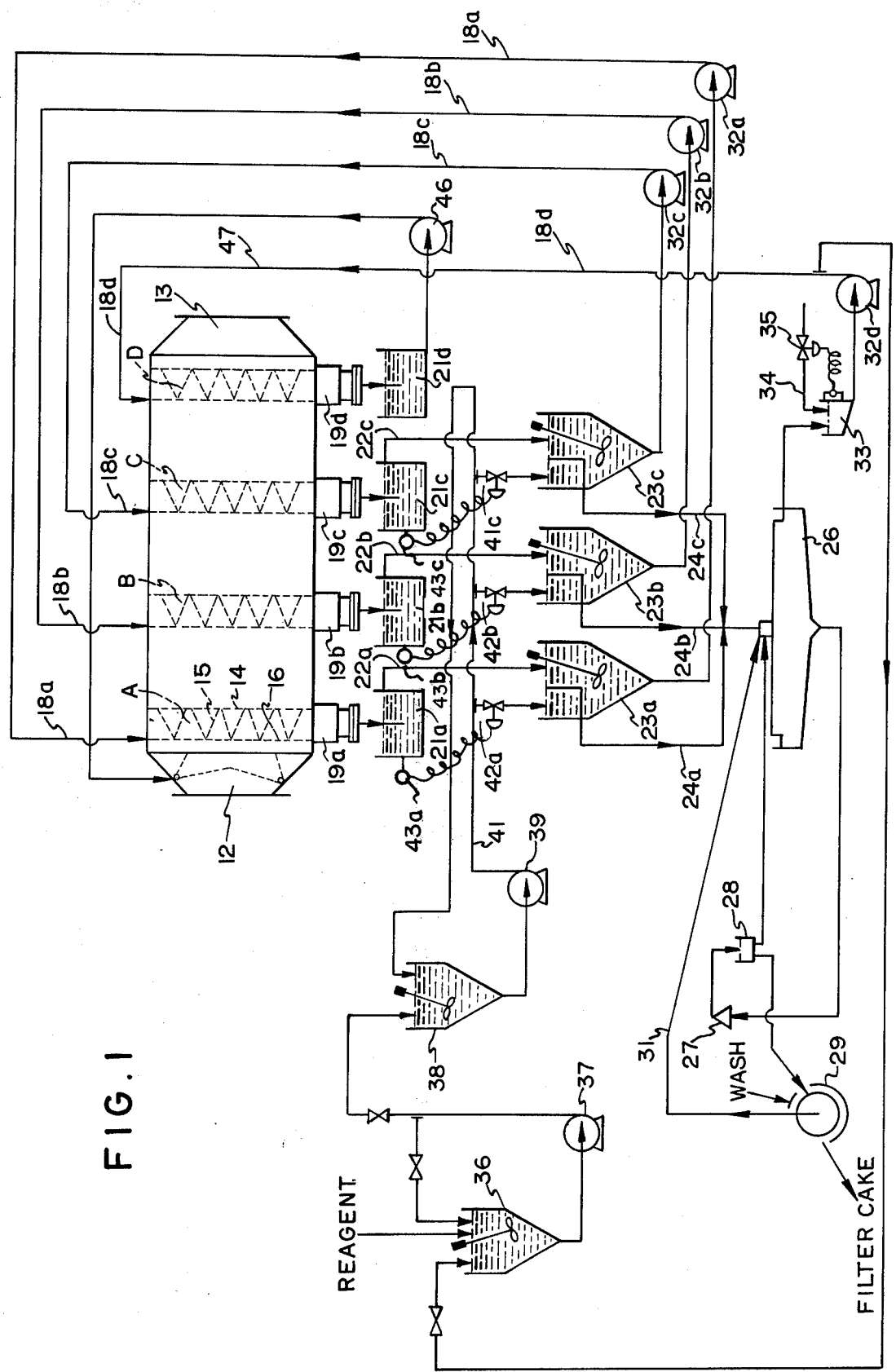
FIG. 1 schematically illustrates a complete apparatus or system for carrying out the process.

The apparatus shown in the drawing includes a scrubber 10 comprising a housing 11 having a gas flow inlet 12 and a discharge outlet 13. The inlet 12 generally is connected to the discharge side of a forced draft fan, or alternatively, the discharge outlet 13 is connected to the intake side of an induced draft fan, whereby the gas passes through the housing 11 at a substantially predetermined velocity. The interior of the housing 11 is provided with means forming the separate successive scrubbing stages A, B, C and D, through which the gas flow is directed.

While various types of scrubbing stages can be used, it is preferable to use stages of the spray type, such as disclosed in U.S. Pat. No. 3,036,417. This type of scrubber is conducive to performing efficiently at relatively low liquid/gas ratios. The drawing schematically indicates stages of this type, with each stage including a rod screen 14, liquid sprays 15 directed toward the rod screen, and a manifold pipe 16 connected to the spray nozzles. Pipes 18a, 18b, 18c and 18d are shown connected to supply the scrubbing medium to the manifolds 16. Also each stage is provided with a lower hopper 19a, 19b, 19c and 19d, which deliver slurry into the seal tanks 21a, 21b, 21c and 21d. Overflow pipes 22a, 22b and 22c lead from the seal tanks to deliver slurry into the mix-delay tanks 23a, 23b, 23c. As schematically indicated these mix-delay tanks are provided with suitable agitators. Supersaturation of the slurry is dissipated by a holding period in these tanks in the order of 3.5 to 5 minutes, and in addition these tanks are employed for alkali conditioning.

Overflow pipes 24a, 24b and 24c are shown extending from the mix-delay tanks 23a, 23b and 23c for delivering overflow to the common thickener 26. A suitable pump 27 is shown connected to deliver underflow from the thickener 26 to a flow divider box 28 whereby a part of the thickened underflow is returned to the thickener, and another part sent to the filter 29. The filter is shown being supplied with wash water and the filtrate is shown being returned by line 31 to the inlet of the thickener 26. The filter cake containing precipitated solids and mechanically entrained scrubbing liquor constitutes the system blowdown.

The pumps 32a, 32b and 32c are shown having their inlets connected to the corresponding mix-delay tanks 23a, 23b and 23c, and these pumps deliver slurry to the lines 18a, 18b and 18c, leading to the stages A, B and C.

An additional pump 32d is shown with its discharge side connected to the pipe 18d, leading to the last stage D. The suction side of this pump is shown connected with tank 33, which receives partially clarified overflow liquor from the thickener 26. This tank may receive make-up water supplied by line 34 and as regulated by the level controlled valve 35.

FIG. 1 also shows means for preparing make-up milk of lime slurry, and for delivering this slurry in controlled amounts to the mix-delay tanks 23a, 23b and 23c. This consists of a mixing tank 36 which receives the lime reagent and water, or some of the effluent from the pump 32d. Pump 37 is connected to recirculate the slurry through the tank 36, and slurry is bled off from the discharge side of this pump and delivered to the hold up tank 38. Pump 39 has its suction side connected to tank 38 and its discharge side connected to a pipe loop 41 which leads to the mix-delay tanks 23a, 23b and 23c, and has a return back to the tank 38. Valvess 42a, 42b and 42c are separately controllable and serve to control flow of slurry from the loop 41 to each of the delay tanks. Each valve is shown schematically as being automatically operated by pH responsive devices 43a, 43b and 43c. These devices are responsive to the pH of the slurry within the corresponding seal tanks.

It may be explained that the slurry received by each of the seal tanks from the corresponding scrubbing stage may be at a pH below that which it is desired to maintain for optimum operation. Therefore the function of the pH control is to admit make-up milk of lime slurry from pipe loop 41 in such controlled amounts as to maintain the pH at a desired value in each of the seal tanks.

With respect to the last scrubbing stage D it is desirable to provide a pump 46 which takes liquid from the seal tank 21d and delivers it by pipe 47 to spray nozzles located on the inlet side of the scrubbing stage A. This serves to effect some preconditioning of the gas and to reduce the gas temperature to adiabatic saturation levels.

Operation of the apparatus described above, and the manner in which the present process is carried out, is as follows: It is assumed that the inlet 12 of the scrubber 10 is connected to the discharge side of a forced draft fan, or alternatively the output 13 is connected to the intake of an induced draft fan which receives stack gases resulting from burning coal or oil having a relatively high sulfur content. The sulfur dioxide content of such stack gases may be of the order of 3000 parts per million. Such a gas generally contains other contaminants, including carbon dioxide and dust particles. A milk of lime slurry is prepared in the mixing tank 36 and is held in the tank 38. Assuming that the lime used in preparing the slurry is calcium hydroxide, or calcium oxide which is hydrated to calcium hydroxide, then the lime content in the make-up slurry may range from about 15% to 19% by weight (CaO basis). For this range of lime content the hydrogen ion concentration of the fresh slurry will vary from about 10.5 to 11.0 pH. The velocity of gas flow through the scrubber may vary in different instances, but preferably is maintained at a substantially predetermined value, and may for example be of the order of 4000 to 3 million cubic feet per minute. Likewise the temperature will vary in different instances, depending upon the origin of the gases, but in a typical instance may be of the order of 250° to 330° F. For purposes of start-up the pumps 32a, 32b and 32c are placed in operation and initial amounts of fresh slurry are introduced into the delay tanks 23a, 23b and 23c, from the line 41. Within the scrubber the slurry introduced into the stages A, B and C is dispersed in the form of spray droplets, with these droplets being directed against and serving to wet the rod screens. The droplets may impinge upon the screens with sufficient velocity to effect some rebound in the manner described in U.S. Pat. No. 3,036,417. As the gas flow occurs through these stages it comes into intimate contact with the solids-liquid surfaces of the droplets, and also with the slurry films on the surfaces of the screens. As a result sulfur dioxide is absorbed and/or adsorbed by the slurry and the slurry films, due to reactions which are relatively complicated, but which include the formation of sulfurous acid and the reaction of such acid with the lime or limestone surfaces present. Slurry draining from the stages A, B and C is received in the seal tanks 21a, 21b and 21c. During start-up the pH of this collected slurry gradually decreases until it reaches a hydrogen ion concentration approaching a pH of 5.5 after which amounts of lime slurry are introduced from line 41 to the mix-delay tanks to maintain the pH of the slurry in each of the seal tanks at about the same value, namely at or about 5.5 to 6.0, preferably about 5.5 to 5.6. The process has now reached equilibrium, and thereafter all of the stages A, B and C operate at a pH value at or about this value. Likewise each stage receives slurry which has been removed from the same stage.

Under the conditions of operation and control described above, the scrubber operates effectively to remove sulfur dioxide. For example when the inlet gas flow has a sulfur dioxide concentration of 3000 ppm, the scrubber outlet gas flow will have a sulfur dioxide concentration of 374 ppm. Under such conditions the efficiency of sulfur dioxide removal is 87.51%.

A characteristic of the process is that the amount of make-up milk of lime slurry added to the delay tanks 23a, 23b and 23c will vary. Particularly it is greatest for the tank 23a and progressively less for the tanks 23b and 23c. To continue the example referred to above, the amount of milk of lime ($Ca(OH)_2$) added to the tank 23a may be equivalent to 0.812 pounds moles of CaO per hour. For tank 23b the additions of lime can amount to 0.406 pounds moles of CaO per hour. For the third tank 23c, the lime addition can amount to 0.203 pounds moles of CaO per hour. Thus in this example the amount of lime added to the tanks 23a, 23b and 23c aggregates 1.421 pounds moles of CaO per hour. Such additions provide the amount of lime required for stoichiometric reaction with the $SO_2$ gas present. Since stoichiometric absorption additions per stage are of the order of 0.60 to 0.65 moles CaO per pound mole of $SO_2$ in the gas stream at corresponding $SO_2$ removal efficiencies of 50% to 60% per stage, the thickener 26 serves to thicken the overflows from the delay tanks 23a, 23b and 23c, thus providing a positive bleed-off of a thickened underflow to supply the filter 29. The amount of make-up lime added maintains the pH of the seal tanks in each stage at a level of 5.5 to 5.6.

It is desirable to disperse a liquid scrubbing medium into the gas stream as it enters the scrubber. The pump 46 together with pump 47 serves this purpose, and makes use of slurry draining from the last so-called polishing stage D of the scrubber. The overflow from the thickener 26 is used to supply liquid to stage D by way of the pump 32d through the controlled additions of make-up water as indicated to maintain a constant volume of liquid to stage D which is used mainly to provide a cleanup scrubbing operation for residual particulate matter and slurry carry over from stages A, B and C.

The collection efficiency of $SO_2$ is directly related to the stoichiometric ratio of CaO to $SO_2$ which is directly correlated to the pH in the scrubber effluent liquor in the seal tank. There is a maximum pH range of 5.6 to 6.0 beyond which scaling problems become excessive. At the high end of the pH range, scale forms from (a) the formation of finely dispersed calcium carbonate by reaction of the lime and carbon dioxide in the gas, and (b) the conversion of relatively soluble calcium bisulfite and bisulfate to the corresponding relatively insoluble calcium sulfite and sulfate compounds. To maintain the pH range at the above levels to avoid scale formations, the collection efficiency in each stage is limited to a maximum of about 50% to 60% with corresponding maximum stoichiometric absorption addition on the order of 0.60 to 0.65 moles CaO per pound mole of $SO_2$. It has been found that by use of multiple scrubbing stages with close pH control in each stage within the above limits, the cumulative removal of $SO_2$ may be increased to a desired level above 50% to 60% depending upon the number of stages employed while avoiding scale formation problems in the system. In contrast, collection efficiency above, say 50–60% in a single stage, requires a pH above 6.0 which leads to corresponding scale formation problems as defined previously.

The process and apparatus described above has a number of advantages over prior scrubbing processes and apparatus making use of a lime slurry. Particularly it has been found that when the pH of the slurry is controlled in the manner described above, and maintained at a value of the order of 5.5 to 6.0, preferably 5.5 to 5.6 as removed from each of the stages A, B and C, the removal of sulfur dioxide from the gas flow is not only effective and efficient, but in addition scaling is reduced to a minimum or prevented entirely. Supersaturation of scale forming compounds in the slurry, which tends to cause scale formation, is dissipated in the separate mix-delay tanks simultaneously with alkali conditioning. Absence of scaling in the scrubber and adjacent pipe lines is attributed to the fact that precipitation of such hydrated materials as calcium carbonate, calcium sulfite and calcium sulfate occurs in the respective mix-delay tanks at the point of milk of lime additions while being inhibited or reduced to a minimum, in the scrubber, under the specified control conditions. Furthermore, the precipitated solids produced in the mix-delay tanks are removed from the system via lines 24a, 24b and 24c and directed to the thickener 26. Thus the apparatus can be operated over long periods of time without the necessity of frequent shut downs for scale removal. Minimizing the precipitation of substances like calcium carbonate, calcium sulfite and calcium sulfate in the scrubber also serves to maintain the slurry active for the removal of sulfur dioxide, because the solid lime or limestone particles in the slurry are not coated over by crystals of such precipitate. In other words the lime or limestone particles remain in a condition best suited to the reactions involved.

As previously mentioned the process and apparatus can be used for the removal of sulfur dioxide from various industrial waste gases. All fossil fuels, including coal and various petroleum products, contain varying amounts of sulfur, which produces sulfur dioxide when burned. Also in the smelting of sulfur bearing ores, the gaseous products evolved include substantial amounts of sulfur dioxide. With the present process and apparatus all such gaseous products can be treated to effectively remove sulfur dioxide to acceptable levels without serious scale formation.

While the process and apparatus has been described above as primarily for the purpose of removing sulfur dioxide from gases, it will be recognized that the scrubber has the inherent function of removing certain other substances from gas, particularly dust particles. Also a minute amount of other products of combustion, such as carbon dioxide and other vapors will be removed by absorption or solution. Assuming the removal of solid dust particles, this material is removed from the system by way of the filter cake obtained in the operation of filter 29.

Reference has been made to use of scrubbing stages using sprays directed against a rod screen through which the gas is directed (e.g., as in U.S. Pat. No. 3,036,417) at relatively low liquid/gas ratios. Irrespective of the construction used for the successive stages, they should be operated at low liquid/gas ratios, preferably between 5 and 10 U.S. gallons of slurry per 1000 cubic feet of gas.

In the foregoing, particular reference is made to the use of milk of lime slurry as a scrubbing medium. In certain instances it may be desirable to employ other alkali reagents, with or without lime, as for example slurries of magnesium hydroxide, or slurries of sodium based compounds with the present process and apparatus serving to prevent or minimize scale formation.

What is claimed is:

1. In a scrubbing process for removing sulfur dioxide from waste gases, the process making use of a scrubber having a plurality of scrubber stages through which the gas is directed with each stage having separate means for introducing and for removing liquid scrubbing medium, the steps comprising passing the sulfur dioxide containing waste gases sequentially through each of said steps, continuously and separately supplying each stage with a milk of lime slurry as a scrubbing medium, the slurry for each stage being supplied from an independent mix-delay tank for each stage, supplying each of said mix-delay tanks with lime slurry removed from said stages, and supplying fresh make up slurry to each of said mix-delay tanks in such controlled amounts as to maintain the pH of the slurry removed from each scrubber stage within the range of 5.5 to 6.0.

2. A process as in claim 1 in which the pH range is about 5.5 to 5.6.

3. A process as in claim 1 in which the waste gas is directed through a scrubbing stage following the aforesaid scrubbing stage, and in which the excess slurry from all of the holding tanks is subjected to a thickening operation, and the overflow from the thickening operation used to supply scrubbing medium for said additional stage.

4. A process as in claim 3 in which the slurry supplied to said additional stage is controlled with respect to its pH, whereby the pH value of the same is maintained substantially constant.

* * * * *